Sept. 22, 1942.  H. R. SEELEN  2,296,579
GLASS ENVELOPE SEAL
Filed Nov. 30, 1940
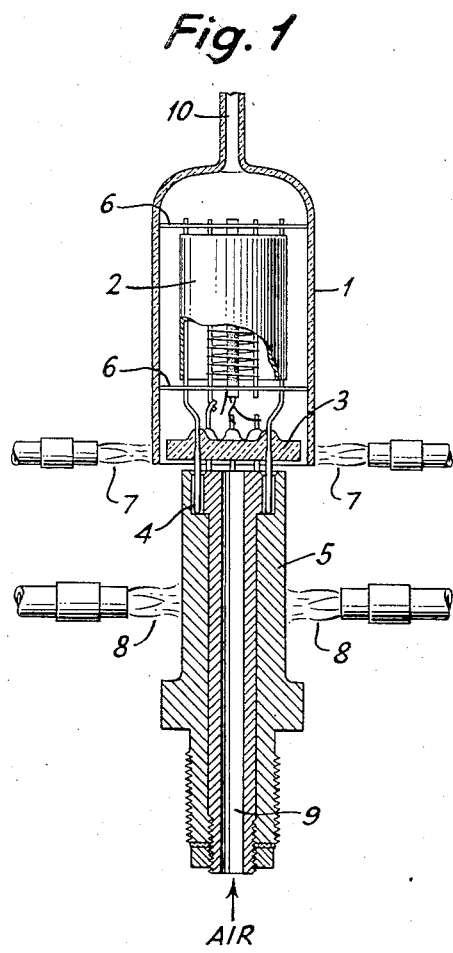
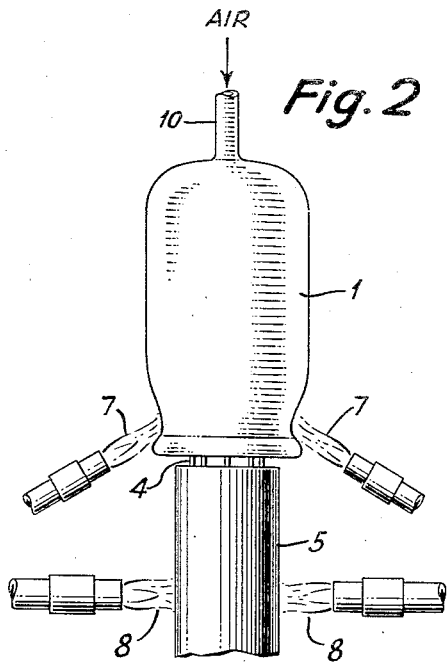
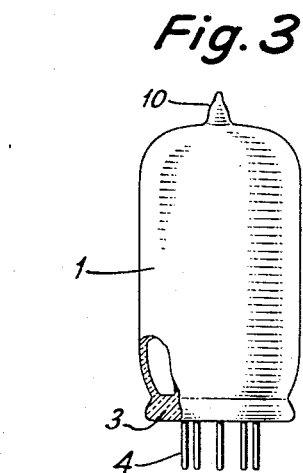
INVENTOR.
HARRY R. SEELEN
BY *Charles McClay*
ATTORNEY.

Patented Sept. 22, 1942

2,296,579

UNITED STATES PATENT OFFICE 2,296,579

GLASS ENVELOPE SEAL

Harry R. Seelen, Short Hills, N. J., assignor to Radio Corporation of America, a corporation of Delaware Application November 30, 1940, Serial No. 367,933

5 Claims. (Cl. 49—78)

My invention relates to glass seals, particularly to seals for glass envelopes of radio tubes.

The header for closing the end of the glass bulb or shell of the envelope of some commercial types of radio tubes comprises a glass disc or button through which is sealed lead-in conductors for the electrodes of the tube. If the outer ends of the conductors are large and employed as the contact pins of the tube, the disc must be quite thick and strong to support the conductors. Difficulty is experienced in making the disc-to-shell seal without producing excessive strains in the relatively large glass mass of the disc or in the wall of the shell near the disc. It is particularly difficult to rapidly make good seals in the factory where speed is essential. Cracking during or after sealing results in large numbers of defective tubes.

The object of my invention is an improved method of making a strong hermetic seal between the glass disc header and shell of a radio tube envelope, the disc and seal region being free of harmful strains.

The characteristic features of my invention are defined in the appended claims and one embodiment is described in the following specification and shown in the accompanying drawing in which—

Figure 1 is a sectional elevational view of a glass envelope of a radio tube and means for sealing the envelope in accordance with my invention;

Figure 2 shows a glass envelope tube after the disc-to-shell seal is completed, and Figure 3 shows the completed tube with the seal partly in section.

The shell 1 of the radio tube envelope shown in Figure 1 is telescoped over the electrode assembly 2 with the rim of the shell contiguous the edge of the glass disc header 3. Preferably, the rim overlies the edge of the header although the shell rim may abut the upper side of the header. The contact pins 4, arranged in a circle and hermetically sealed through the disc and connected to their respective electrodes of the assembly 2, are inserted in holes or wells in the upper end of the spindle chuck 5. The depth of the wells is preferably less than the length of the pins so as to hold the glass disc slightly above the upper surface of the chuck. The envelope shell is held in place by the flexible edges of the insulating spacers 6 of the electrode assembly, or if desired, a separate overhead collet axially aligned with chuck 5 may be employed to hold the shell until it is joined to its header. Gas burners 7 are pointed and focussed upon the rim of the shell opposite the edge of the header and for uniform heating along the periphery of the header the chuck is rotated in the flames. The chuck is preheated with burners 8 to a temperature preferably below 300° C. or the deformation temperature of the glass in order to heat the header by radiation to a slightly elevated temperature until it enters the sealing fires. Good results have been obtained by heating the chuck to 260° C. In this way no excessive heat shock is transmitted to the stem on encountering the first sealing fires. Sealing speeds may be increased by also preheating the headers. By heating the header to about the chuck temperature, say 260° C., the header temperature will drop but little and the hard sealing fires can be applied soon after the header and shell are loaded on the chuck.

I propose according to my invention to artificially cool the center portion of the glass disc while its edge is raised to sealing temperature. I propose also to hold the temperature of the relatively large mass of metal of the contact pins well below glass sealing temperature. That is, the temperature of the pins and center portion of the disc is prevented from being raised above the preheat temperature by the sealing fires. In the case of commercial soft glass this temperature is preferably held at 300° C. or less, which is below the deformation temperature of the glass. By controlling the temperature of the center of the disc and the pins during sealing, the seals may be heated and cooled rapidly, imposing sudden temperature changes on the glass that would be expected to fracture the glass. Oxidation of the metal parts connected to the pins is minimized. I have found the most convenient way of cooling the center of the disc and the pins is by a blast of air slightly above room temperature directed to the bottom center of the disc from the air duct comprising a small vertical bore 9 through the center of the spindle chuck 5. Alternatively the disc may be cooled by mechanical contact with the center of the chuck or by air admitted to the lower ends of the contact pin wells. I have found that the distribution of compressional and tensional strains, usually represented by isoclinic lines concentric with the disc and slightly wavy opposite the contact pins, may be accurately controlled by adjustment of the sealing flames and the supply of air at the center, and I have also found it to be possible to control the nature of the strain in the seal region itself. In factory practice best results may be obtained by adjusting the flames and air so as to produce a neutral to slight compressional strain along the outside edge of the disc.

It is my belief the method of sealing envelopes described here is the only known method applicable to factory practice where high production requires rapid temperature changes in the relatively heavy glass and metal parts.

Tubes of the type shown and commercially known as the "Miniature tube," such as the 1R4 or 1S5, have been made at the rate of 600 or over per hour on the conventional 16-head "Sealex" machine which indexes step-by-step carrying the tubes on the heads past gas flames focused on the glass and spindle. The shell and header of these tubes may be of commercial lead glass known as AJ glass having a thermal coefficient of expansion of about $9.6 \times 10^{-6}$ and having seven 40 mil contact pins in a circle .375 inch in diameter and of chrome iron having a coefficient of thermal expansion of $10.5 \times 10^{-6}$. Commercial G12 glass and "dumet" leads may be substituted if desired. The glass shell has a diameter of .687 inch, a length of about 1.5 inches, and a wall thickness of .020 to .030 inch joined to a glass header about .100 inch in thickness.

A firing schedule found to consistently give good seals is specifically described here by way of example. It will be obvious to those skilled in the art that many variations and adjustments may be made in the fires and air flow to obtain the desired results. Experience has shown that for any burner setting, the strain pattern in the glass is quite sensitive to the air flow. The standard 16-head "Sealex" machine is used on which the spindle chucks are held about seven seconds in each indexing position and the chucks are rotated as they come to rest in front of variously adjusted burners with flames of commericial illuminating gas. In positions 1, 2 and 3 the header with the attached electrode assembly is placed on the chuck and the glass shell lowered in place as shown in Figure 1. In position 4 the chuck is warmed about three-quarters of an inch below the end of the chuck with hard gas flames having one inch cones directed downwardly 15° and, if an overhead collet is employed to hold the shell, it also should be heated. In position 5 the heating of the chuck is continued to raise its temperature to about 270° C. and the shell just above the header is heated with a medium hard flame with a seven-eighth inch cone as well as with a fish tail burner in a horizontal plane. In position 6 the lower edge of the shell is heated with a hard flame from three outside burners, each producing a one and one-half inch cone. In position 7 heating of the lower end of the shell continues with three hard flames having one and five-eighth inch cones, the burners being directed toward the center of the vertical edge of the button. Here, air at room temperature is admitted through duct 9 at the rate of 11 cubic feet per hour, the volume being measured with a flow gauge of free air at atmospheric pressure. The temperature of the air as it strikes the header is probably slightly above room temperature. In position 8 the fires are continued as in position 7 and the air rate is increased to 14.5 cubic feet per hour. In this position the rim of the shell is sufficiently soft to weld with the edge of the header. In positions 8 and 9 the air flow is increased to 22.7 cubic feet per hour, the fires are removed, and air at the proper pressure is admitted to the interior of the shell through the exhaust tube 10 to force out and shape the soft wall of the shell just above the seal. In position 9 the stem is cooled by admitting air at the rate of about 68 cubic feet per hour to the chuck. In position 10 cooling continues with an air flow of 50 cubic feet per hour. In position 11 the shell is annealed from one medium flame with a three-eighth inch cone directed upwardly about 30° onto the seal while air is admitted at the rate of about 40 cubic feet per hour. In this position the seal cools to a very dull red. In position 12 the annealing fires of position 11 are repeated and the air rate is reduced to 36 cubic feet per hour. The seal here becomes colorless. In position 13 no air or fire is directed on the glass but hard flames are employed to heat the chuck. In position 14 all fires and air are removed. As the head indexes into position 15 the tube is pushed up and released from the chuck and in position 16 the tube is unloaded.

The envelope is finally degassed, exhausted, and the exhaust tube sealed off. Glass radio tubes with disc headers may be sealed according to my invention at high speed in factory practice without producing harmful strains in the glass.

I claim:

1. The method of making a radio tube envelope having a glass shell closed at one end with a glass disc type header comprising telescoping the shell over the header so that the rim of the shell overlies the edge of the header, heating the shell rim and header edge to welding temperature, and artificially cooling the central portion of the disc to control the strains in the disc and in the seal region at said rim.

2. The method of making a glass envelope having a glass shell closed at one end with a flat glass disc through which metal lead-in conductors are sealed, comprising holding the disc in the end of the shell with the rim of the shell overlying the edge of the disc, blowing air at room temperature against the center of the disc, and heating the shell rim and disc edge to sealing temperature, and continuing the air blowing after the seal is made.

3. The method of fabricating a radio tube envelope with a shell and flat header of glass having a thermal coefficient of expansion less than $10^{-5}$, and metal contact pins having a thermal coefficient of expansion more than $10^{-5}$ sealed in the header and arranged in a circle concentric with the disc, comprising heating the disc and pins to a temperature below 300° C., heating the edge portion of the disc and the contiguous rim of the shell to sealing temperature while maintaining the temperature of the central portion of the disc and pins to said temperature below 300° C., and cooling the central portion more rapidly than the rim of the disc.

4. The method of sealing a glass disc in the end of a glass shell comprising heating the contiguous edges of the disc and shell to sealing temperature, and at the same time blowing air at about room temperature onto the central portion of the disc, the air flow being adjusted to prevent the temperature of said portion from rising above the deformation temperature of the glass, then increasing the air flow after the seal is made to rapidly cool the glass, and finally heating the glass to annealing temperature.

5. The method of making a radio tube envelope having a glass shell closed at one end with a glass disc containing a plurality of lead-in conductors arranged in a circle substantially concentric with said disc and projecting normal to the outer surface of said disc, comprising mounting said lead-in conductors on a support with said disc close to but spaced from said support, placing said shell over said disc, heating the edge of the disc and the contiguous portion of the shell to glass sealing temperature, and admitting cooling air through an opening in said support opposite the central portion of said disc and forcing the air against said central portion and hence radially outward in all directions between the disc and the support and around said conductors, controlling the rate of air flow during and after sealing to prevent cracking strains in the disc and the disc-to-shell seal region as the glass cools to room temperature.

HARRY R. SEELEN.